(12) United States Patent
Patel et al.

(10) Patent No.: US 7,659,684 B2
(45) Date of Patent: Feb. 9, 2010

(54) METHOD AND SYSTEM FOR OPERATING A MOTOR TO AVOID SELECTED PULSE RATIO VALUES

(75) Inventors: Nitinkumar R. Patel, Cypress, CA (US); Bonho Bae, Torrance, CA (US); Steven E. Schulz, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 403 days.

(21) Appl. No.: 11/738,854

(22) Filed: Apr. 23, 2007

(65) Prior Publication Data

US 2008/0260362 A1 Oct. 23, 2008

(51) Int. Cl.
*G05B 11/01* (2006.01)
(52) U.S. Cl. ...................... 318/629; 318/632

(58) Field of Classification Search ................. 318/629, 318/632, 638, 807, 808
See application file for complete search history.

(56) References Cited

U.S. PATENT DOCUMENTS

| | | | | |
|---|---|---|---|---|
| 3,808,481 A | * | 4/1974 | Rippel | 318/139 |
| 5,486,748 A | * | 1/1996 | Konrad et al. | 318/811 |
| 5,604,672 A | * | 2/1997 | Yoshida et al. | 363/97 |
| 6,236,184 B1 | * | 5/2001 | Baker | 318/803 |

* cited by examiner

*Primary Examiner*—Rina I Duda
(74) *Attorney, Agent, or Firm*—Ingrassia Fisher & Lorenz, P.C.

(57) ABSTRACT

A method and system for operating a motor are provided. Power is provided to the motor through at least one switch operating at a first switching frequency. A pulse ratio of the motor is calculated based on the first switching frequency. The at least one switch is operated at a second switching frequency if the calculated pulse ratio is less than a first pulse ratio value and greater than a second pulse ratio value.

11 Claims, 3 Drawing Sheets

METHOD AND SYSTEM FOR OPERATING A MOTOR TO AVOID SELECTED PULSE RATIO VALUES

TECHNICAL FIELD

The present invention generally relates to motors, and more particularly relates to a method and system for operating an electric motor to avoid selected pulse ratio values.

BACKGROUND OF THE INVENTION

In recent years, advances in technology, as well as ever evolving tastes in style, have led to substantial changes in the design of automobiles. One of the changes involves the complexity, as well as the power usage, of the electrical systems within automobiles, particularly alternative fuel vehicles, such as hybrid, electric, and fuel cell vehicles. Such alternative fuel vehicles typically use an electric motor, perhaps in combination with another actuator, to drive the wheels.

For high speed applications, such as use in an alternative fuel vehicle, a sufficiently large "pulse ratio" is required to provide important information about the performance of the motor, such as motor terminal currents and rotor position. The pulse ratio may be defined as the ratio of the switching frequency of the inverter, which converts direct current (DC) power from a battery to alternating current (AC) power, to the fundamental frequency of the motor.

In recent years, the number of poles and the operating speeds of the motors used in such vehicles have been increased. As a result, the fundamental frequencies of the motors have also increased, which has consequently decreased the pulse ratios. One of the problems encountered during the operation of these motors is the occurrence of oscillations, known as "beat frequency oscillations," in the stator current due to Non-triplen Odd Harmonics (NTOHs) in the pulse ratio. These oscillations can hinder the performance of the motor, and, over long periods of time, damage the transistors within the inverters.

Accordingly, it is desirable to provide a method and system for operating a motor that prevents the oscillations due to the NTOHs. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method for operating a motor is provided. Power is provided to the motor through at least one switch operating at a first switching frequency. A pulse ratio of the motor is calculated based on the first switching frequency. The at least one switch is operated at a second switching frequency if the calculated pulse ratio is less than a first pulse ratio value and greater than a second pulse ratio value.

An automotive drive system is also provided. The system includes an electric motor, a direct current (DC) power supply coupled to the motor, an inverter including at least one transistor and coupled to the electric motor and to the DC power supply to receive DC power from the DC power supply and provide alternating current (AC) power to the electric motor, and a processor in operable communication with the electric motor, the DC power supply, and the inverter. The processor is configured to operate the at least one transistor at a first switching frequency to convert the DC power to the AC power, calculate a pulse ratio of the electric motor based on the first switching frequency, and operate the at least one transistor at a second switching frequency if the calculated pulse ratio is less than a first pulse ratio value and greater than a second pulse ratio value.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, and brief summary, or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-6 are merely illustrative and may not be drawn to scale.

FIG. 1 to FIG. 6 illustrate a method and system for operating a motor. At least one switch coupled to the motor is operated at a first switching frequency to provide power to the motor. A pulse ratio of the motor is calculated based at least in part on the first switching frequency. The at least one switch is operated at a second switching frequency if the calculated pulse ratio is less than a first pulse ratio value and greater than a second pulse ratio value.

The method and system may be implemented in an automobile and used to control an electric motor that is used to drive the wheels of the automobile. The at least one switch may be one or more transistors of an inverter within the automobile that is used to convert direct current (DC) power from a DC power source to alternating current (AC) power suitable for use by the electric motor.

Figure 1:
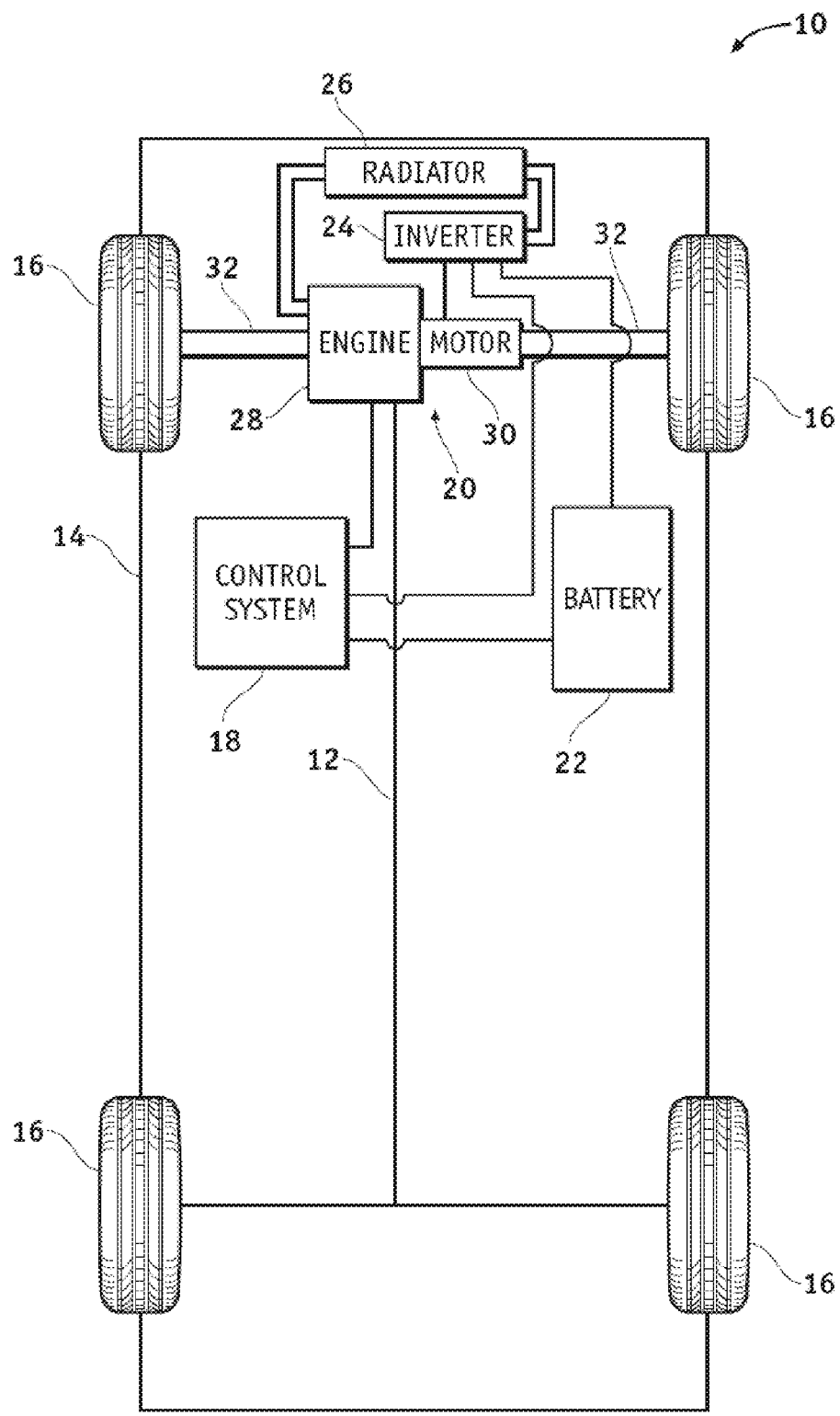
FIG. 1 is a schematic view of an exemplary automobile according to one embodiment of the present invention.

FIG. 1 illustrates a vehicle 10, or "automobile", according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment illustrated in FIG. 1, the automobile 10 is a hybrid vehicle, and further includes an actuator assembly 20, a battery 22, a power inverter assembly (or inverter) 24, and a radiator 26. The actuator assembly 20 includes a combustion engine 28 and an electric motor/generator (or motor) 30. As will be appreciated by one skilled in the art, the electric motor 30 includes a transmission therein, and although not illustrated also includes a stator assembly (including conductive coils), a rotor assembly (including a ferromagnetic core), and a cooling fluid (i.e., coolant). The stator assembly and/or the rotor assembly within the electric motor 30 may include multiple electromagnetic poles (e.g., sixteen poles), as is commonly understood.

Still referring to FIG. 1, in one embodiment, the combustion engine 28 and the electric motor 30 are integrated such that both are mechanically coupled to at least some of the wheels 16 through one or more drive shafts 32. The radiator 26 is connected to the frame at an outer portion thereof and although not illustrated in detail, includes multiple cooling channels therein that contain a cooling fluid (i.e., coolant) such as water and/or ethylene glycol (i.e., "antifreeze) and is coupled to the engine 28 and the inverter 24.

Figure 2:
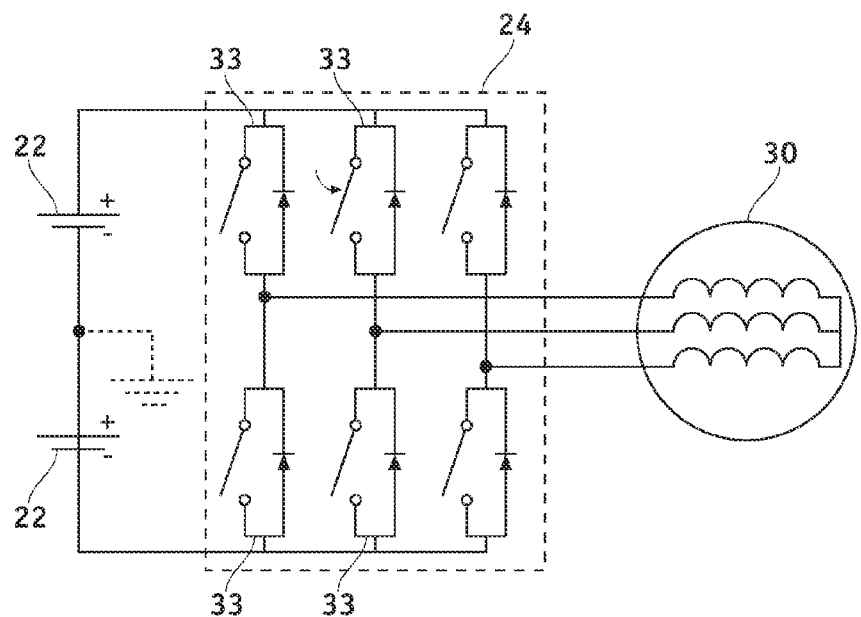
FIG. 2 is a schematic view of an inverter within the automobile of FIG. 1.

FIG. 2 schematically illustrates the inverter 24 in greater detail. In the depicted embodiment, the inverter 24 includes three pairs of series switches 33 (i.e., transistors). Although not specifically illustrated, in one embodiment, the inverter 24 also includes multiple power module devices. The power module devices each include a semiconductor substrate (e.g., silicon substrate) with an integrated circuit formed thereon that includes one or more of the switches 33 in the form of individual semiconductor devices, such as insulated gate bipolar transistors (IGBTs), as is commonly understood. As shown, the inverter 24 is coupled to the battery 22 and the electric motor 30.

Referring again to FIG. 1, in the depicted embodiment, the inverter 24 receives and shares coolant with the electric motor 30. The radiator 26 may be similarly connected to the inverter 24 and/or the electric motor 30.

The electronic control system 18 is in operable communication with the actuator assembly 20, the battery 22, and the inverter 24. Although not shown in detail, the electronic control system 18 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below. It should be understood that the inverter control module may also be integrated into the power inverter assembly 24.

During operation, still referring to FIG. 1, the vehicle 10 is operated by providing power to the wheels 16 with the combustion engine 28 and the electric motor 30 in an alternating manner and/or with the combustion engine 28 and the electric motor 30 simultaneously. In order to power the electric motor 30, DC power is provided from the battery 22 to the inverter assembly 24, which converts the DC power into AC power, before the power is sent to the electric motor 30. As will be appreciated by one skilled in the art, the conversion of DC power to AC power is substantially performed by operating (i.e., repeatedly switching) the transistors 33 within the inverter 24 at a "switching frequency" ($F_{sw}$), such as, for example, 12 kilohertz (kHz).

Figure 3:
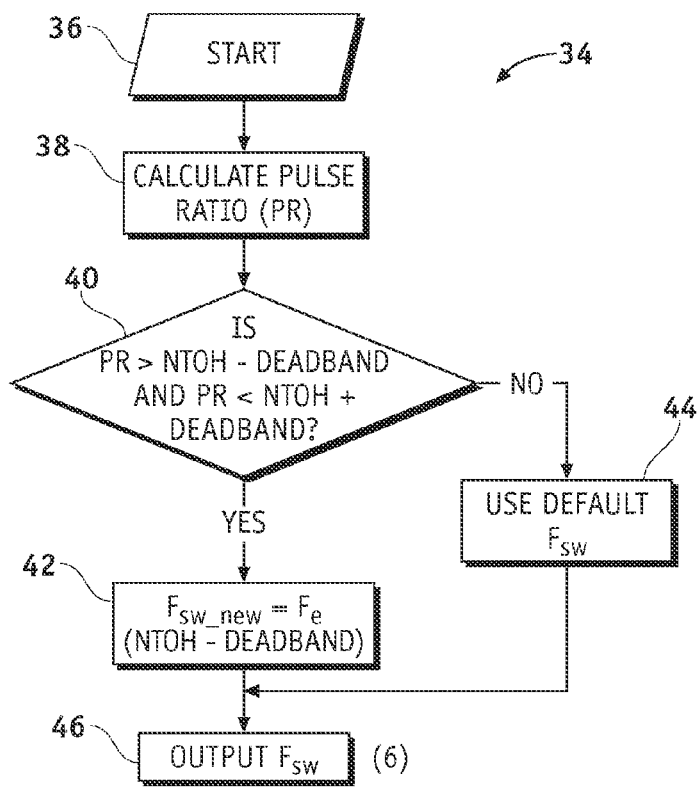
FIG. 3 is a block diagram of a method and/or system for operating a motor within the automobile of FIG. 1.

FIG. 3 illustrates a method and/or system 34 for operating the electric motor 30, according to one embodiment of the present invention. At block 36, the method begins with the operation of the electric motor 30, as described above. At block 38, a pulse ratio (PR) for the current operation of the electric motor 30 is calculated. The pulse ratio may be expressed as $$PR = F_{sw}/F_e,$$

where $F_e$ is the fundamental frequency of the electric motor, as is commonly understood. The fundamental frequency ($F_e$) may be expressed as $$F_e = RPM \cdot n/120$$

where RPM (i.e., revolutions per minute) is the current rate of operation of the electric motor 30 and n is the number of poles in the electric motor 30.

At block 40, the determination is made as to whether the current pulse ratio of the motor 30 is within a predetermined pulse ratio band gap value (DeadBand) of a particular pulse ratio value, or any one of a plurality of particular pulse ratio values. The particular pulse ratio values may correspond to harmonics of the fundamental frequency ($F_e$) of the motor 30. In one embodiment, the pulse ratio values correspond to Non-triplen Odd Harmonics (NTOHs), as will be appreciated by one skilled in the art. The Non-triplen Odd Harmonics may be, for example, the fifth, seventh, eleventh, or thirteenth NTOH. The pulse ratio band gap may be, for example, between 0.4 and 0.5.

Still referring to FIG. 3, in one embodiment, the determination of block 40 includes determining whether or not the current pulse ratio (PR) is greater than the difference between any of the NTOH values and the pulse ratio band gap value (i.e., a first pulse ratio value) and less than the sum of the same NTOH value and the pulse ratio band gap value (i.e., a second pulse ratio value). If both conditions in block 40 are met, the method and/or system 34 continues to block 42 where a new, or second, switching frequency ($F_{sw\_new}$) is calculated. As shown, the new switching frequency ($F_{sw\_new}$) may be expressed as $$F_{sw\_new} = F_e \cdot (NTOH - \text{DeadBand}).$$

If both conditions in block 40 are not met, the method and/or system 34 continues to block 46, where the initial, or default, switching frequency (e.g., 12 kHz) is selected for continued use. The switching frequency, from either block 42 or 44, is then sent to block 46 to be used as the output switching frequency (Output $F_{sw}$) for the method and/or system 34 to be used in the inverter 24.

Thus, if the current pulse ratio of the electric motor 30 is within the range as defined by the pulse ratio band gap value of a NTOH, the switching frequency ($F_{sw}$) is adjusted in order to avoid the pulse ratio from reaching the NTOH. If the current pulse ratio is not within the defined range, the inverter 24 continues to operate at the current (e.g., the initial) switching frequency.

Figure 4:
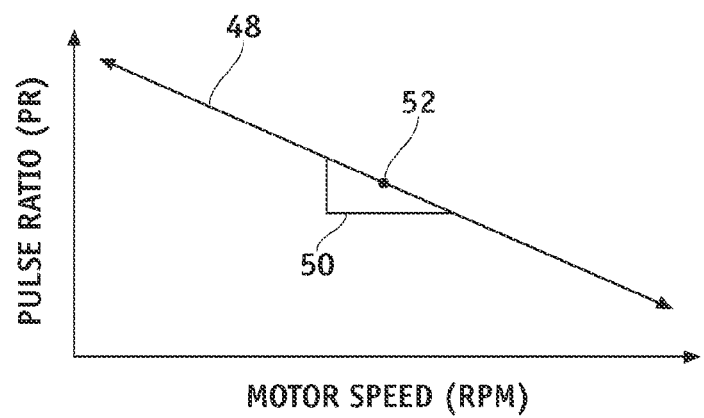
FIG. 4 is a graphical illustration depicting the operation of a motor utilizing the method and/or system of FIG. 3.

The method and/or system 34 shown in FIG. 3 is repeated continuously during the operation of the vehicle 10 to monitor the pulse ratio and appropriately modify the switching frequency ($F_{sw}$) to avoid the Non-triplen Odd Harmonics. FIG. 4 graphically illustrates the operation of the method and/or system 34 of FIG. 3 during various stages of operation of the vehicle 10. Line 48 represents the pulse ratio of the motor 30. As will be appreciated by one skilled in the art, the pulse ratio decreases as the rate of operation of the motor, or motor speed, increases (assuming constant switching frequency). It should be understood that although line 48 is shown as being straight in FIG. 4, line 48 may represent only a portion of a PR curve which may have a shape similar to a graph of the function "1/x," as is commonly understood.

The effect of the method and/or system 34 shown in FIG. 3 is to create a "notch" 50 in the line, or pulse ratio, 48 such that the pulse ratio 48 does not reach the NTOH 52. Thus, as the motor speed changes (i.e., acceleration or deceleration) during vehicle operation, the pulse ratio 48 "bypasses" the NTOH 52 by having the switching frequency ($F_{sw}$) adjusted, as described above and shown in FIG. 3, to follow the pulse ratio values indicated by the notch 50. It should be understood that the NTOH 52 shown may correspond to any of the NTOH values mentioned above.

Figure 5:
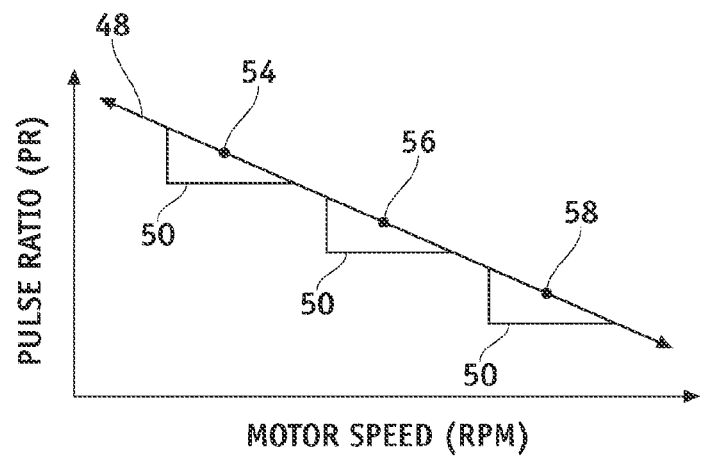
FIG. 5 is graphical illustration further depicting the operation of a motor utilizing the method and/or system of FIG. 3.

FIG. 5 graphically illustrates the effect of the method and/or system of FIG. 3 in relationship to multiple NTOHs 54, 56, and 58. As shown, multiple notches 50 are formed in the pulse ratio 48 to bypass each of the NTOHs 54, 56, and 58. The NTOHs 54, 56, and 58 shown in FIG. 5 may correspond to, for example, the seventh, eleventh, and thirteenth NTOH, respectively.

One advantage of the method and/or system described above is that operation at selected harmonics, such as NTOHs, is avoided. As a result, the presence of beat frequency oscillations is reduced which may improve system performance and reduce stress on the transistors within the inverter.

Figure 6:
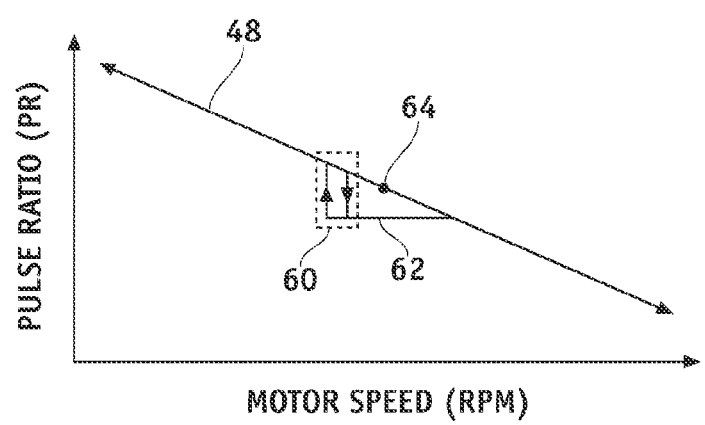
FIG. 6 is a graphical illustration depicting the operation of a motor utilizing a method and/or system according to another embodiment of the present invention.

FIG. 6 graphically illustrates an alternative embodiment in which a hysteresis 60 is provided in notch 62. As will be appreciated by one skilled in the art, the hysteresis 60 shown may be provided by utilizing different pulse ratio band gap values (DeadBand) during acceleration and deceleration of the motor 30. Thus, the exact pulse ratio 48 at which the switching frequency ($F_{sw}$) is adjusted is dependent on whether the motor speed is increasing or decreasing through NTOH 64. That is, a first pulse ratio band gap value may be used if the motor 30 is accelerating, and a second pulse ratio band gap value may be used if the motor 30 is decelerating. Although only one notch 62 is shown in FIG. 5, it should be understood that the hysteresis 60 may be implemented in a system for bypass multiple NTOHs, such as the one shown in FIG. 5. A further advantage of the method and/or system depicted in FIG. 6 is that if the motor speed is hovering near the upper or lower end of the notch 62, the switching frequency ($F_{sw}$) will not experience abrupt changes, which may not be desirable during high speed operation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating a motor comprising:
    providing power to the motor through at least one switch operating at a first switching frequency, wherein the motor comprises a selected number of poles and said providing of the power to the motor causes the motor to operate at a rate;
    calculating a pulse ratio of the motor based on the first switching frequency, wherein the calculating of the pulse ratio comprises determining a fundamental frequency of the motor based on the selected number of poles and the rate of operation of the motor; and
    operating the at least one switch at a second switching frequency if the calculated pulse ratio is less than a first pulse ratio value and greater than a second pulse ratio value, wherein the first pulse ratio value is greater than a selected pulse ratio value and the second pulse ratio value is less than the selected pulse ratio value and the selected pulse ratio value corresponds to a Non-triplen Odd Harmonic of the fundamental frequency.

2. The method of claim 1, wherein the Non-triplen Odd Harmonic is at least one of the fifth, seventh, eleventh, and thirteenth Non-triplen Odd Harmonic.

3. The method of claim 2, wherein the first pulse ratio value is a pulse ratio band gap value greater than the Non-triplen Odd Harmonic and the second pulse ratio value is the pulse ratio band gap value less than the Non-triplen Odd Harmonic.

4. The method of claim 3, further comprising calculating the second switching frequency, the calculating of the second switching frequency comprising:
    calculating a difference between the Non-triplen Odd Harmonic and the pulse ratio band gap value; and
    multiplying the fundamental frequency by the difference between the Non-triplen Odd Harmonic and the pulse ratio band gap value.

5. The method of claim 4, wherein the at least one switch is a transistor within an automotive power inverter.

6. A method for operating an electric motor within an automobile comprising:
    providing alternating current (AC) power to the electric motor through an inverter having at least one transistor operating at a first switching frequency to cause the electric motor to operate at a rate, wherein the electric motor comprises a selected number of poles;
    altering the AC power to adjust the rate of operation of the electric motor;
    monitoring a pulse ratio of the motor based on the first switching frequency, wherein the monitoring of the pulse ratio comprises determining a fundamental frequency of the motor based on the selected number of poles; and
    operating the at least one transistor at a second switching frequency if the pulse ratio is within a pulse ratio band gap value of any one of a plurality of selected pulse ratio values, wherein each of the plurality of selected pulse ratio values corresponds to a Non-triplen Odd Harmonic of the fundamental frequency.

7. The method of claim 6, further comprising calculating the second switching frequency, the calculating of the second switching frequency comprising:

calculating a difference between the Non-triplen Odd Harmonic and the pulse ratio band gap value; and multiplying the fundamental frequency by the difference between the Non-triplen Odd Harmonic and the pulse ratio band gap value.

8. The method of claim 7, wherein the pulse ratio band gap value is a first pulse ratio band gap value if the rate of operation of the electric motor is increasing and the pulse ratio band gap value is a second pulse ratio band gap value if the rate of operation of the electric motor is decreasing.

9. An automotive drive system comprising:

an electric motor comprising a selected number of poles;

a direct current (DC) power supply coupled to the motor;

an inverter comprising at least one transistor and coupled to the electric motor and to the DC power supply to receive DC power from the DC power supply and provide alternating current (AC) power to the electric motor; and a processor in operable communication with the electric motor, the DC power supply, and the inverter, the processor being configured to:

operate the at least one transistor at a first switching frequency to convert the DC power to the AC power;

calculate a pulse ratio of the electric motor based on the first switching frequency, wherein the calculating of the pulse ratio comprises determining a fundamental frequency of the motor based on the selected number of poles and a rate of operation of the electric motor; and operate the at least one transistor at a second switching frequency if the calculated pulse ratio is less than a first pulse ratio value and greater than a second pulse ratio value, wherein the first pulse ratio value is greater than a selected pulse ratio value and the second pulse ratio value is less than the selected pulse ratio value, and the selected pulse ratio value corresponds to a Non-triplen Odd Harmonic of the fundamental frequency.

10. The automotive drive system of claim 9, wherein the processor is further configured to calculate the second switching frequency, the calculating of the second switching frequency comprising:

calculating a difference between the Non-triplen Odd Harmonic and the pulse ratio band gap value; and multiplying the fundamental frequency by the difference between the Non-triplen Odd Harmonic and the pulse ratio band gap value.

11. The automotive drive system of claim 10, wherein the processor is further configured to alter the AC power to adjust the rate of operation of the electric motor, and wherein the pulse ratio band gap value is a first pulse ratio band gap value if the rate of operation of the electric motor is increasing and the pulse ratio band gap value is a second pulse ratio band gap value if the rate of operation of the electric motor is decreasing.

* * * * *